(12) United States Patent
Raynor

(10) Patent No.: US 7,542,087 B2
(45) Date of Patent: Jun. 2, 2009

(54) ORIENTATION SENSOR AND ASSOCIATED METHODS

(75) Inventor: Jeffrey Raynor, Edinburgh (GB)

(73) Assignee: STMicroelectronics Limited, Marlow-Buckinghamshire (GB)

( * ) Notice: Subject to any disclaimer, the term of this patent is extended or adjusted under 35 U.S.C. 154(b) by 713 days.

(21) Appl. No.: 11/154,207

(22) Filed: Jun. 16, 2005

(65) Prior Publication Data
US 2005/0285946 A1 Dec. 29, 2005

(30) Foreign Application Priority Data
Jun. 18, 2004 (EP) .................................. 04253648

(51) Int. Cl.
*H04N 3/12* (2006.01)
(52) U.S. Cl. ................... 348/332; 348/208.99; 250/342
(58) Field of Classification Search ............ 348/208.99, 348/335, 223.1, 332, 208.1, 333.12; 250/225, 250/341.3
See application file for complete search history.

(56) References Cited
U.S. PATENT DOCUMENTS

| 3,252,674 A | 5/1966 | Magnus |
| 3,554,105 A | 1/1971 | Dougherty ................. 350/156 |
| 4,158,506 A | 6/1979 | Collett ....................... 356/365 |
| 4,171,916 A | 10/1979 | Simms et al. ............... 356/366 |
| 5,416,324 A * | 5/1995 | Chun ....................... 250/341.3 |
| 5,900,909 A * | 5/1999 | Parulski et al. ........... 348/231.6 |
| 6,262,769 B1 * | 7/2001 | Anderson et al. ........ 348/333.1 |
| 2001/0007469 A1 | 7/2001 | Fuchimukai et al. ........ 348/208 |

FOREIGN PATENT DOCUMENTS

| EP | 0 352 133 A2 | 1/1990 |
| EP | 1 107 182 | 6/2001 |
| EP | 1 345 422 | 9/2003 |
| WO | 01/2348 A1 | 4/2001 |
| WO | 03/007589 | 1/2003 |
| WO | WO 03007589 A2 * | 1/2003 |

OTHER PUBLICATIONS

Dimitrios Lambrinos; Marinus Maris; Hiroshi Kobayashi; Thomas Labhart; Rolf Pfeifer and Rudiger Wehner; Navigating with Polarized Light Compass.

* cited by examiner

*Primary Examiner*—David L Ometz
*Assistant Examiner*—Ahmed A Berhan
(74) *Attorney, Agent, or Firm*—Lisa K. Jorgenson; Allen, Dyer, Doppelt, Milbrath & Gilchrist, P.A.

(57) ABSTRACT

An orientation sensor for use with an image sensor is provided, which includes at least two polarizers with different orientations and associated photodetectors and a signal processing unit. The orientation sensor can be incorporated in a digital camera. When the camera is exposed to daylight, which is polarized, the relative outputs from the differently oriented polarizers can be compared to record the orientation of the camera. This orientation can be stored with the image data so that a user does not have to manually change the orientation of an image on an image display device.

23 Claims, 4 Drawing Sheets

ORIENTATION SENSOR AND ASSOCIATED METHODS

FIELD OF THE INVENTION

The present invention relates to an orientation sensor, and in particular, to an orientation sensor for use with an image sensor.

BACKGROUND OF THE INVENTION

Digital still cameras are used to take photographs which are usually rectangular, with the dimensions of the rectangle being defined by a long axis and a short axis. The user of a digital still camera (DSC) can operate the camera at any orientation. However, most photographs are taken either in a landscape orientation, where the long axis of a photograph is horizontal, or in a portrait orientation, where the long axis of a photograph is vertical.

Photographs that are taken are subsequently displayed on a display device such as a computer, which will usually present the photographs in a landscape orientation. Thus, any photographs that have been taken in the portrait orientation have to be rotated to be viewed in the correct orientation. This is time-consuming and annoying for a user of the camera and/or the display device.

Some cameras incorporate a mechanical device for measuring the orientation of the camera, such as a mercury or ball based tilt switch. However, these are physically large, which is a major disadvantage for incorporation in a modern DSC, and there are also environmental concerns with the use of mercury.

SUMMARY OF THE INVENTION

According to a first aspect of the present invention, there is provided an orientation sensor for use with an image sensor including at least two polarizers with different orientations, a photodetector associated with each polarizer, and a signal processing unit or means capable of determining the orientation of the image sensor from output signals of the photodetectors when the image sensor is exposed to polarized light.

In further aspects, the invention provides for an image sensor having an image sensing array and at least one orientation sensor.

A method of determining the orientation of an image sensor includes providing at least two polarizers with different orientations, providing a photodetector associated with each polarizer, exposing the image sensor to polarized light, and obtaining and processing output signals from the photodetectors.

BRIEF DESCRIPTION OF THE DRAWINGS

The present invention will now be described, by way of example only, with reference to the accompanying drawings, in which.

DETAILED DESCRIPTION OF THE PREFERRED EMBODIMENTS

The invention relies on the principle that daylight is polarized, due to the scattering of light by dust particles in the atmosphere. This polarization is horizontal in normal daylight situations.

Figure 1:
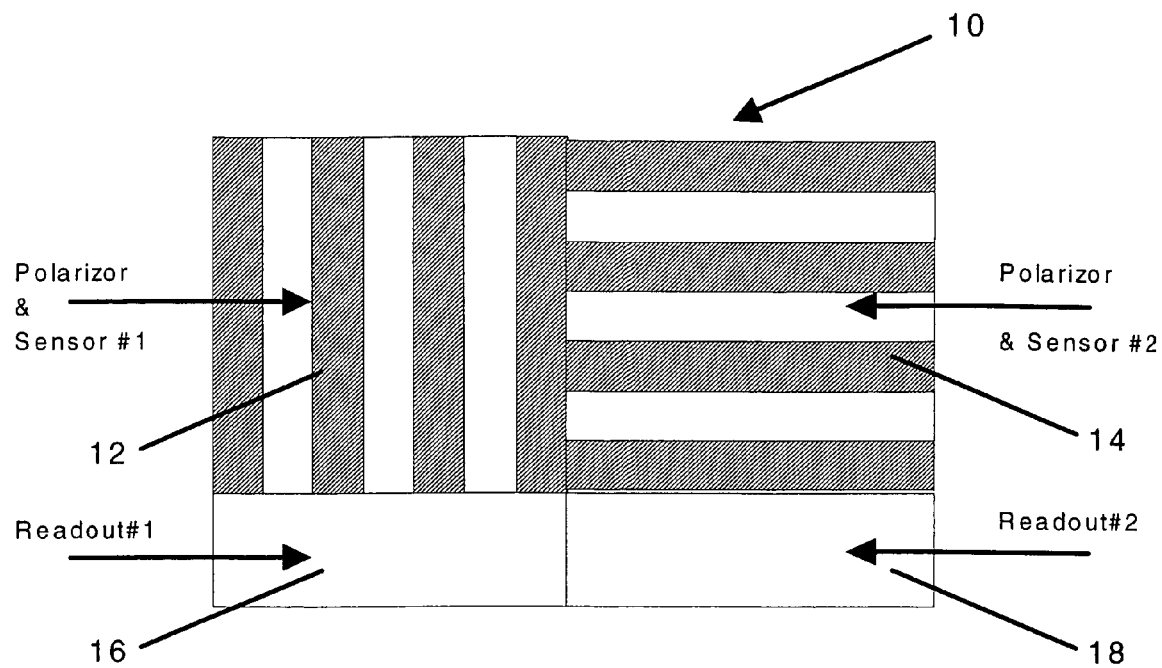
FIG. 1 is a schematic plan view illustrating an orientation sensor according to a first embodiment of the present invention.
Figure 2:
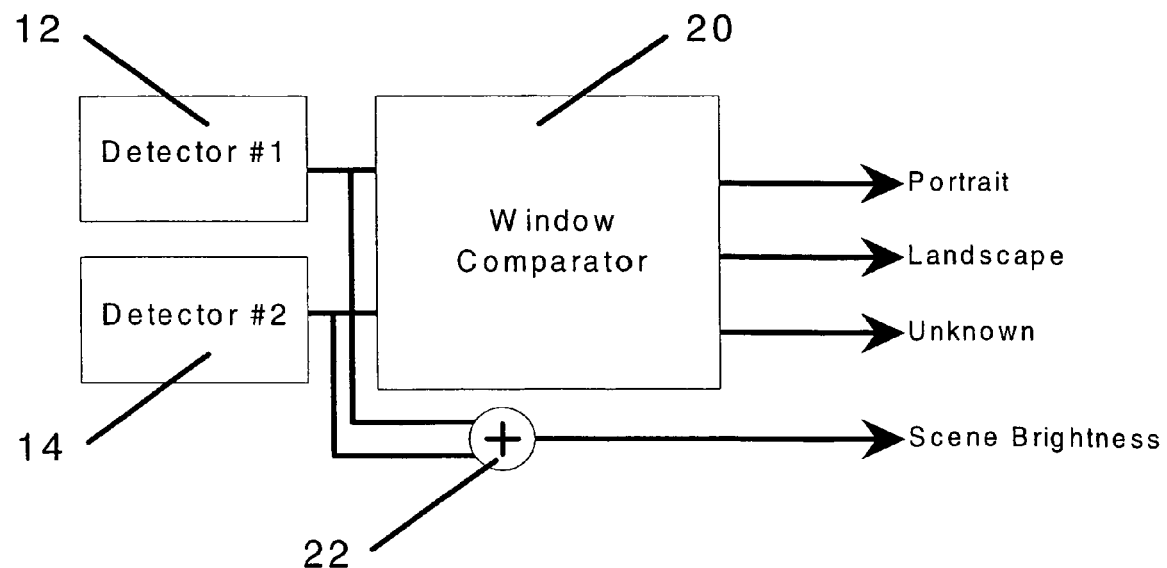
FIG. 2 is a schematic diagram illustrating the system implementation used with the orientation sensor of FIG. 1.

FIGS. 1 and 2 illustrate a first embodiment of the present invention. An orientation sensor 10 comprises a first polarizer 12 with an associated light sensor (not shown) and readout 16 and a second polarizer 14 with an associated light sensor (not shown) and readout 18. Each polarizer with its associated light sensor can be termed to be a polarization "detector".

By "polarizer" it is meant any suitable structure which provides a polarizing effect to light in the visible spectrum that passes through it. The polarizer could take any suitable form, for example a sheet of polarizing film, or a direct metal etching. A polarizer is defined by parallel spaced lines which are alternately transparent and opaque to incident light, and the orientation of a polarizer is defined as the longitudinal axis of these lines, i.e. as the direction of oscillation of the electromagnetic field of incident radiation that is allowed to pass through the polarizer.

In the first embodiment, the first and second detectors 12, 14 are used to measure the polarization of the light when the image is taken. The relative outputs of the detectors 12, 14 are then used to determine the orientation of the image sensor. When the invention is implemented in a DSC, this information can be stored with the picture (for example, with the standard EXIF format) and used later, for example by computer which is operated by image display software, to correct for the orientation of the polarizers 12, 14.

The outputs from the readouts 16, 18 can be manipulated in any suitable way to determine the orientation of the image sensor. One such way is illustrated in FIG. 2. The outputs from the two detectors 12, 14 are compared using a window comparator 20, and an orientation decision is made based on whether the difference between the outputs is greater than a predetermined threshold, as follows: If (output(12)−output(14))>threshold then Portrait mode; If (output(14)−output(12))>threshold then Landscape mode; Else Unknown.

This assumes that light incident on the camera is horizontally polarized, and that detector 14 is horizontally polarized. With different polarizations, the portrait/landscape decision could be reversed. The definitions of landscape and portrait depend on a rectangular image being the result of image detection, as is the case in a DSC. However, it will be appreciated that the decision could be between two arbitrary first and second orientations such that the orientation of an image sensing array of any shape or size can be detected. The concept is thus extendible to other products other than a DSC, for example, an optical mouse, or to a mobile phone incorporating a digital camera, or other non-standard image sensors for specialized applications.

Typically, the threshold will be dependent on the signal levels used to make the system work over a wide range of illumination levels. The signal levels from the detectors themselves can be used for this function.

As a further option, a summer 22 can be provided to infer the brightness of the imaged scenes in which case the decision logic can be represented by the following: If (output (12)− output(14))>(threshold*(output(12)+output(14))) then Portrait mode; If (output (14)−output(12))>(threshold * (output (12)+output(14))) then Landscape mode; Else Unknown.

If the summer 22 is not provided or implemented, the Maximum signal can be used as a crude approximation to scene brightness, the decision logic being represented by: If (output (12)−output(14))>(threshold*Max(output(12), output(14))) then Portrait mode; If (output (14)−output(12))>(threshold*Max(output(12), output(14))) then Landscape mode; Else Unknown.

The schemes described above are simple, "hard-wired" systems. This decision logic could be effectively implemented using a fuzzy logic or neural network type of logic.

Figure 3:
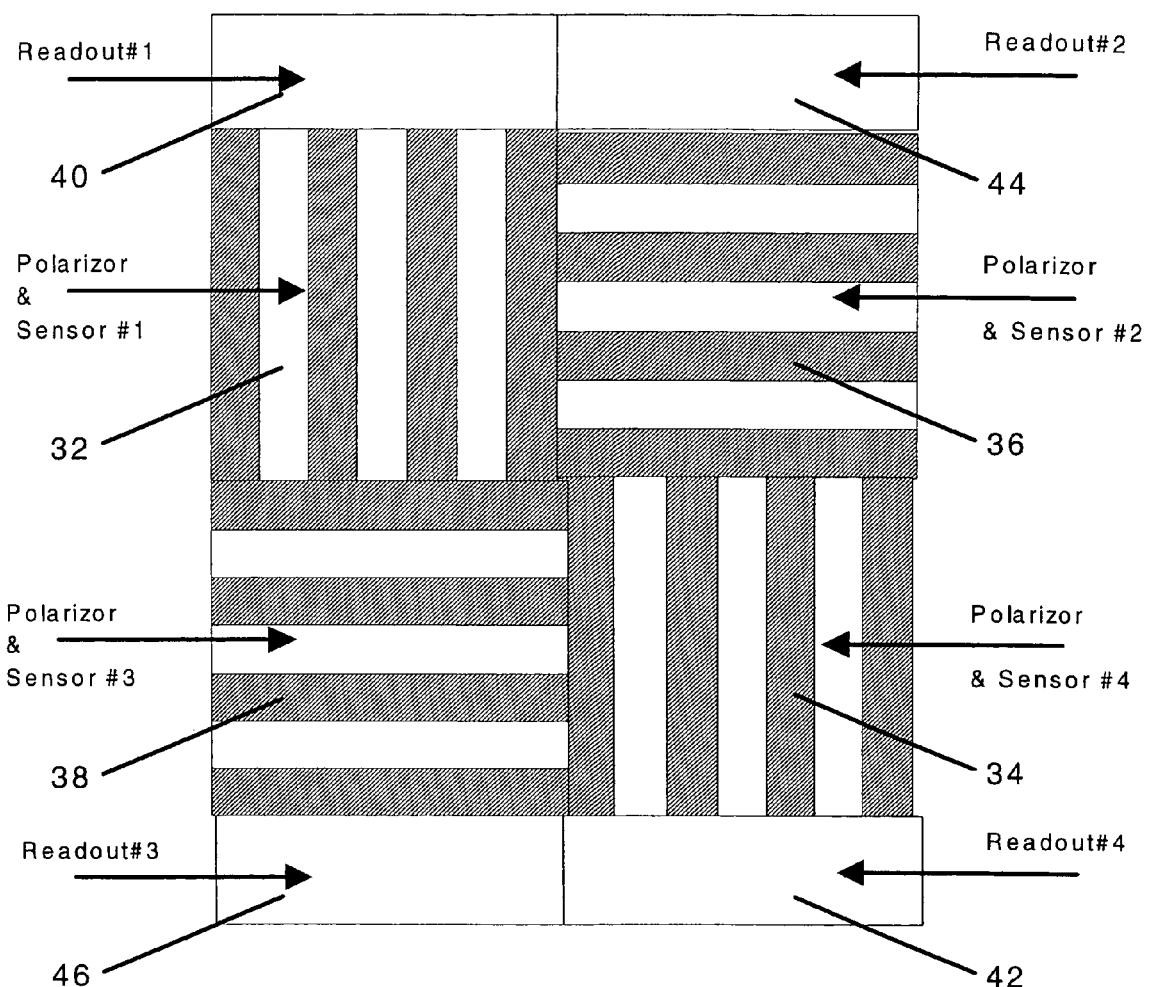
FIG. 3 is a schematic plan view illustrating an orientation sensor according to a second embodiment of the present invention.

As the present invention relies on the detected signal brightness, the configuration shown in FIG. 1 is sensitive to shading across the scene which could be mistaken for variation in polarization. Errors caused in this way are reduced by a second embodiment of the invention, which is illustrated in FIG. 3. As seen in FIG. 3, an orientation sensor 30 comprises first and second vertical detectors 32, 34 and first and second horizontal detectors 36, 38, with associated readouts 40, 42, 44 and 46.

The vertically polarized detectors 32, 34 and the horizontally polarized detectors 36, 38 share a common center. If there is a shading (for example if left is brighter than right), then the left hand vertically polarized detector 32 will have a higher output than the right hand vertically polarized detector 34, and the left hand horizontally polarized detector 38 will have a higher output than the right hand horizontally polarized detector 36.

Although not shown, these differences can be compensated using summers to sum the output from the readout channels with the same polarization before using a comparator to compare with the opposite polarization. An optional summer may be provided, which can be used in the same manner as the summer 22 described in the first embodiment of the present invention.

It will be appreciated that the above first embodiment, comprising two polarizers having opposite orientations, and the above second embodiment, comprising two pairs of polarizers, each pair having opposite orientations, are only specific examples which serve to illustrate the scope of the invention. In variations of these embodiments, any or all of the number of polarizers, the size of a grid of polarizers, and the orientations of polarization of the detectors can be varied.

Figure 4:
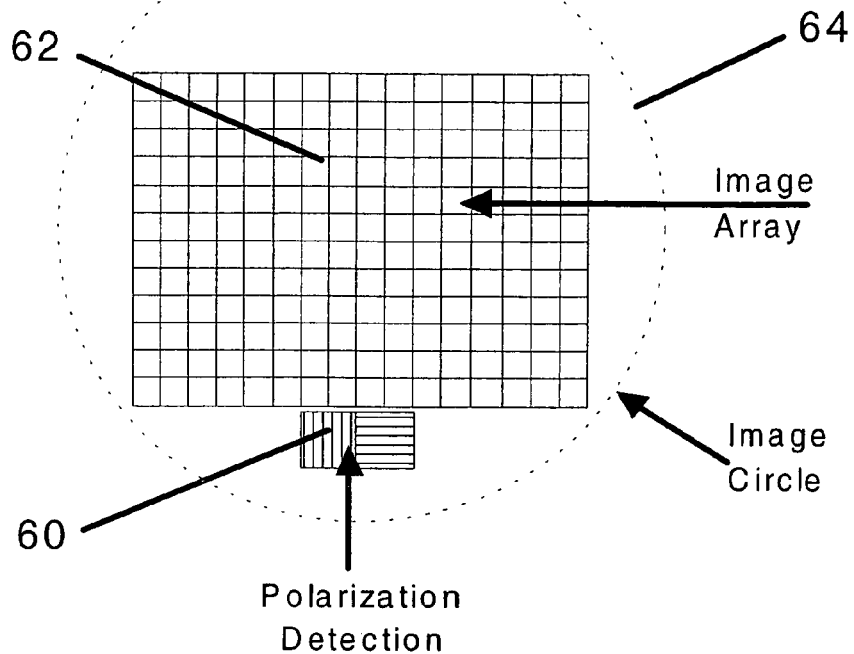
FIG. 4 is a schematic plan view illustrating an image sensor according to a third embodiment of the present invention.

A third embodiment of the invention is illustrated in FIG. 4, which shows an integrated DSC image sensor and orientation sensor. An orientation sensor 60 is placed adjacent to an image sensor array 62. The orientation sensor 60 can be an orientation sensor 10, 30 according to either of the above described first and second embodiments, or a variation thereof.

The orientation sensor 60 is preferably formed on the same substrate as the imaging device. The image plane is usually rectangular and fits inside the image circle 64 of the lens (not shown). If the orientation sensor 60 is close to the imaging array 62, it will be inside the image circle 64 of the camera's optics system. This has the cost advantage of not having to modify the existing optics system.

Although outside the normal image plane, the polarization sensor 10, 30, 60 is larger than the imaging pixels and so does not require an image which is as sharp or bright. Although the orientation sensor can be on any side of the image array 62, it is preferable to have it at the lower side (as mounted in the camera). With this arrangement, it will image the upper part of the camera's field of view. Usually, this will be the sky—which shows the highest amount of polarization. Although the configuration shown in FIG. 4 is a workable system, it has the disadvantage of not being able to distinguish the sense of rotation of a camera, i.e. to distinguish between 90° C. rotation clockwise or anticlockwise.

Figure 5:
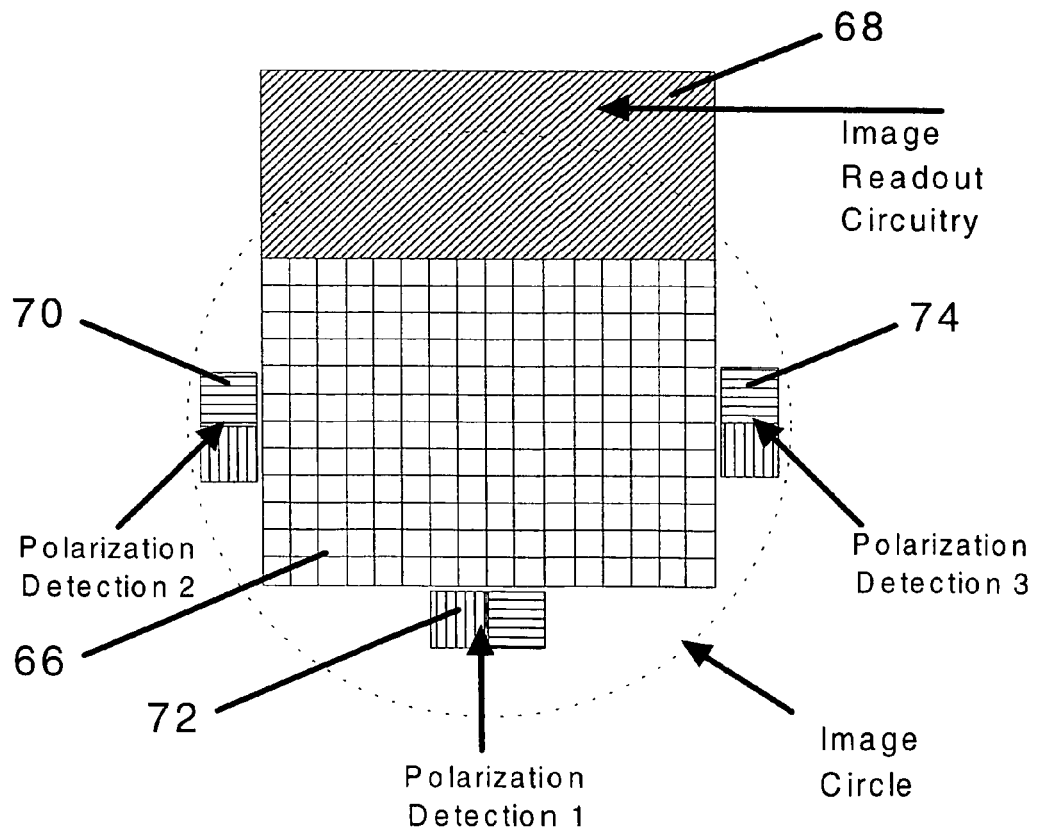
FIG. 5 is a schematic plan view illustrating an image sensor according to a fourth embodiment of the present invention.
Figure 6:
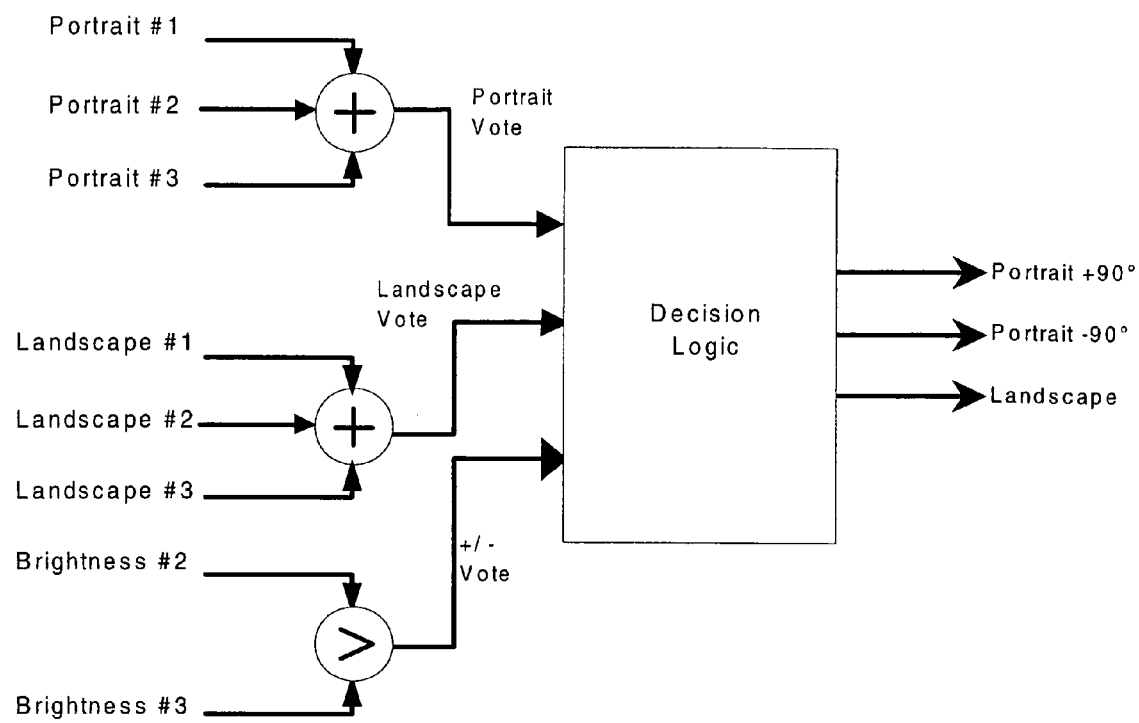
FIG. 6 is a schematic diagram illustrating the system implementation used with the image sensor of FIG. 5.

FIGS. 5 and 6 illustrate a fourth embodiment of the invention, which helps overcome this problem in certain situations. When a photograph is taken in daylight, the lightest part of the screen, usually the sky, is normally at the top of an image. Thus, the signals from three orientation sensors 70, 72, 74 can be processed as illustrated in FIG. 6. The portrait and landscape outputs from the three orientation sensors 70, 72, 74 are summed and the majority decision from these outputs is used to determine between landscape and portrait modes.

If the system has determined that the camera is in portrait mode, then the brightness outputs from the two orientation sensors 70, 74 on the short axes of the sensor 66 are compared. Assuming the configuration shown in FIG. 6 is a view facing the image, then if orientation sensor 70 has a higher scene brightness output than orientation sensor 74, then it is determined that the image sensing array 66 (and hence the image sensor) has been rotated 90° C. clockwise (as viewed by the cameraman, to the rear of the camera), which puts orientation sensor 70 at the physically lower part of the camera—the lens inversion imaging the upper part of the scene on orientation sensor 70.

For all the above embodiments, the polarizers 12, 14, 32, 34, 36, 38 can be manufactured as an integrated photodetector and polarizing assembly. This leads to a smaller and cheaper DSC, and as the polarizer assemblies are stand-alone and use no mechanical parts, the reliability of their operation is therefore enhanced when compared with known polarizers, which are manufactured as separate components to be added to the optical stack. It would of course be possible to fabricate the polarizers separately from the sensors if this is more practical.

The invention has been described above with particular reference to a DSC implementation. However, it will be appreciated that the principles of the invention have a wider application and as such can be considered to extend to other products such as an optical mouse, or a mobile telephone incorporating a digital camera.

Improvements and modifications can be made to the above without departing from the scope of the present invention.

That which is claimed is:

1. An orientation sensor for use with an image sensor and comprising:
    a plurality of polarizers with different orientations;
    a photodetector associated with each polarizer; and
    a signal processor for determining an orientation of the image sensor from output signals of the photodetectors when exposed to polarized light, including determining that the orientation is in at least one of a first state, a second state and an unknown state based on a difference between two output signals relative to a threshold.

2. The orientation sensor of claim 1, wherein the polarizers comprise first and second polarizers having perpendicular orientations.

3. The orientation sensor of claim 1, wherein the polarizers comprise a grid of polarizers, wherein adjacent polarizers have perpendicular orientations.

4. The orientation sensor of claim 2, wherein the first polarizer has an orientation parallel to a landscape mode of operation of the image sensor, and the second polarizer has an orientation parallel to a portrait mode of operation of the image sensor.

5. The orientation sensor of claim 1, wherein the signal processor comprises a comparator arranged to compare the brightness of outputs from the photodetectors.

6. The orientation sensor of claim 5, wherein the signal processor further comprises an adder arranged to sum outputs of the photodetectors to obtain a signal representative of an overall scene brightness.

7. An image sensor comprising:
   an image sensing array; and
   at least one orientation sensor comprising
      a plurality of polarizers with different orientations,
      a photodetector associated with each polarizer, and
      a signal processor for determining an orientation of the image sensing array from output signals of the photodetectors when exposed to polarized light, including determining that the orientation is in at least one of a first state, a second state and an unknown state based on a difference between two output signals relative to a threshold.

8. The image sensor of claim 7, wherein the at least one orientation sensor is positioned adjacent to the image sensing array.

9. The image sensor of claim 8, further comprising a lens defining an image circle; and wherein the at least one orientation sensor is positioned within the image circle.

10. The image sensor of claim 8 wherein the at least one orientation sensor is positioned adjacent a portion of the image sensing array that images an upper portion of a field of view of the image sensing array.

11. The image sensor of claim 8, wherein the at least one orientation sensor comprises a plurality of orientation sensors positioned at different sites adjacent to the image sensing array.

12. The image sensor of claim 11, wherein the sites comprise at least two of: a site adjacent a portion of the image sensing array which images an upper portion of a field of view; a site adjacent a portion of the image sensing array which images a left side portion of the field of view; and a site adjacent a portion of the image sensing array which images a right side portion of the field of view.

13. An electronic device comprising:
   image sensor including an image sensing array and at least one orientation sensor, the orientation sensor comprising
      a plurality of polarizers with different orientations,
      a photodetector associated with each polarizer, and
      a signal processor for determining an orientation of the image sensing array from output signals of the photodetectors when exposed to polarized light, including determining that the orientation is in at least one of a first state, a second state and an unknown state based on a difference between two output signals relative to a threshold.

14. The electronic device of claim 13 wherein the electronic device comprises a digital camera.

15. The electronic device of claim 13 wherein the electronic device comprises an optical mouse.

16. The electronic device of claim 13 wherein the electronic device comprises a mobile telephone having a digital camera.

17. A method of determining the orientation of an image sensor, the method comprising:
   providing a plurality of polarizers with different orientations;
   providing a photodetector associated with each polarizer; and
   processing output signals from the photodetectors when exposed to polarized light to determine the orientation of the image sensor, including determining that the orientation is in at least one of a first state, a second state and an unknown state based on a difference between two output signals relative to a threshold.

18. The method of claim 17, wherein processing comprises comparing a brightness of the output signals from the photodetectors.

19. The method of claim 17, wherein determining is based on ascertaining whether the difference between the two output signals exceeds a product of the threshold and a sum of the two output signals.

20. The method of claim 17, wherein determining is based on ascertaining whether the difference between the two output signals exceeds a product of the threshold and a greater of the two output signals.

21. The method of claim 17, wherein determining is based upon a comparison of a plurality of polarizers oriented in a first orientation state and a plurality of polarizers oriented in a second orientation state.

22. The method of claim 21, wherein the first orientation state corresponds to a landscape mode and the second orientation state corresponds to a portrait mode.

23. The method of claim 17, further comprising storing the determined orientation with image data collected by the image sensor.

\* \* \* \* \*